United States Patent
Murata et al.

(10) Patent No.: US 9,753,617 B2
(45) Date of Patent: Sep. 5, 2017

(54) INFORMATION PROCESSING APPARATUS, AND INFORMATION PROCESSING METHOD

(71) Applicant: FUJITSU LIMITED, Kawasaki-shi, Kanagawa (JP)

(72) Inventors: Masakazu Murata, Kawasaki (JP); Katsuaki Akama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 345 days.

(21) Appl. No.: 14/341,960

(22) Filed: Jul. 28, 2014

(65) Prior Publication Data

US 2015/0089420 A1 Mar. 26, 2015

(30) Foreign Application Priority Data

Sep. 24, 2013 (JP) ................................ 2013-197541

(51) Int. Cl.
*G06F 3/0484* (2013.01)
*G06F 3/0488* (2013.01)
(Continued)

(52) U.S. Cl.
CPC ........ *G06F 3/0484* (2013.01); *G06F 3/04883* (2013.01); *G06F 17/24* (2013.01)

(58) Field of Classification Search
None
See application file for complete search history.

(56) References Cited

U.S. PATENT DOCUMENTS 6,309,305 B1 * 10/2001 Kraft .................. G06F 9/543
455/414.1
7,138,983 B2 * 11/2006 Wakai .................. G06F 3/017
178/18.01

(Continued)

FOREIGN PATENT DOCUMENTS

EP 2511810 A2 10/2012
JP 05-274307 10/1993

(Continued)

OTHER PUBLICATIONS

EESR—Extended European Search Report of European Patent Application No. 14180416.1, dated Feb. 5, 2015.

(Continued)

*Primary Examiner* — Stella E Higgs
(74) *Attorney, Agent, or Firm* — Fujitsu Patent Center

(57) ABSTRACT

An information processing apparatus includes a memory; and a processor coupled to the memory, wherein the processor executes a process includes, detecting flick operation in a text area where an input character string is displayed, determining a direction of the detected flick operation, selecting, when the flick operation is performed in a predetermined direction, characters the number of which is according to a length of the flick operation from the character string located at a starting position of the flick operation, storing the selected characters in a finger recording buffer, obtaining, when the flick operation is performed in a direction reverse to the predetermined direction, the number of characters according to the length of the flick operation from the finger recording buffer, and outputting the obtained characters to the starting position of the flick operation in the text area.

5 Claims, 6 Drawing Sheets

(51) Int. Cl.
*G06F 17/27* (2006.01)
*G06F 17/24* (2006.01)

(56) References Cited

U.S. PATENT DOCUMENTS

| | | | |
|---|---|---|---|
| 2003/0059244 A1* | 3/2003 | Konishi | B41J 3/46 400/615.2 |
| 2006/0210958 A1 | 9/2006 | Rimas-Ribikauskas et al. | |
| 2007/0247441 A1* | 10/2007 | Kim | G06F 3/04883 345/173 |
| 2008/0036743 A1* | 2/2008 | Westerman | G06F 3/038 345/173 |
| 2009/0140998 A1* | 6/2009 | Jung | G06F 3/0488 345/173 |
| 2009/0307589 A1* | 12/2009 | Inose | G06F 3/04845 715/702 |
| 2010/0235793 A1* | 9/2010 | Ording | G06F 1/1626 715/863 |
| 2011/0102336 A1* | 5/2011 | Seok | G06F 3/04883 345/173 |
| 2011/0181524 A1* | 7/2011 | Hinckley | G06F 3/04883 345/173 |
| 2011/0219323 A1* | 9/2011 | Woo | G06F 3/02 715/769 |
| 2012/0293427 A1* | 11/2012 | Mukai | G06F 3/04883 345/173 |
| 2013/0080979 A1* | 3/2013 | Weir | G06F 3/033 715/856 |
| 2013/0234936 A1* | 9/2013 | Urakawa | H04N 1/00411 345/157 |
| 2014/0123042 A1* | 5/2014 | Lee | G06F 3/04883 715/765 |
| 2014/0304634 A1* | 10/2014 | Kumazawa | G06F 3/0486 715/770 |
| 2015/0026620 A1* | 1/2015 | Kwon | G06F 3/04845 715/770 |
| 2015/0268854 A1* | 9/2015 | Kim | G06F 3/04812 715/773 |
| 2016/0041965 A1* | 2/2016 | Ghassabian | G06F 3/005 715/261 |
| 2016/0048284 A1* | 2/2016 | Kim | G06F 3/0488 715/770 |
| 2016/0154686 A1* | 6/2016 | Huang | G06F 3/0488 715/770 |

FOREIGN PATENT DOCUMENTS

| | | |
|---|---|---|
| JP | 2007026121 A * | 2/2007 |
| JP | 2011-128864 | 6/2011 |
| JP | 2013-186874 | 9/2013 |

OTHER PUBLICATIONS

JPOA—Office Action of Japanese Patent Application No. 2013-197541 dated Feb. 14, 2017, with English translation.

* cited by examiner

INFORMATION PROCESSING APPARATUS, AND INFORMATION PROCESSING METHOD

CROSS-REFERENCE TO RELATED APPLICATIONS

This application is based upon and claims the benefit of priority of the prior Japanese Patent Application No. 2013-197541, filed on Sep. 24, 2013, the entire contents of which are incorporated herein by reference.

FIELD

The embodiment discussed herein is related to an information processing apparatus, an information processing method, and an information processing program.

BACKGROUND

A type of an information processing apparatus including a display with a touch panel, in which a display device is integrated with an operation device to form, has been known. To copy a character string, a copy button pops up on the information processing apparatus when a user designates a starting character and an ending character by touch operation. When an operation of the copy button is detected, the information processing apparatus stores the character string between the starting and ending characters in a buffer. When a user designates a copying position by touch operation, a paste button pops up on the information processing apparatus. When an operation of the paste button is detected, the information processing apparatus pastes the character string stored in the buffer on the copying position.

Japanese Laid-open Patent Publication No. 2011-128864

However, when the character string is copied in this manner, the number of procedures to operate the copy button and the paste button increases. Further, to paste the character string by the paste button as mentioned above, the entire character string stored in the buffer has to be pasted, and it is not possible to divide the character string stored in the buffer and paste a part of the character string first, followed by pasting the rest of the character string after characters have been entered by key input.

SUMMARY

According to an aspect of an embodiment, an information processing apparatus includes a memory; and a processor coupled to the memory, wherein the processor executes a process includes, detecting flick operation in a text area where an input character string is displayed, determining a direction of the detected flick operation, selecting, when the flick operation is performed in a predetermined direction, characters the number of which is according to a length of the flick operation from the character string located at a starting position of the flick operation, storing the selected characters in a finger recording buffer, obtaining, when the flick operation is performed in a direction reverse to the predetermined direction, the number of characters according to the length of the flick operation from the finger recording buffer, and outputting the obtained characters to the starting position of the flick operation in the text area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. The embodiments are not intended to limit a technique disclosed herein. Also, the embodiments described below may be appropriately combined so long as such combinations are consistent with the embodiments.

[a] Embodiment

Figure 1:
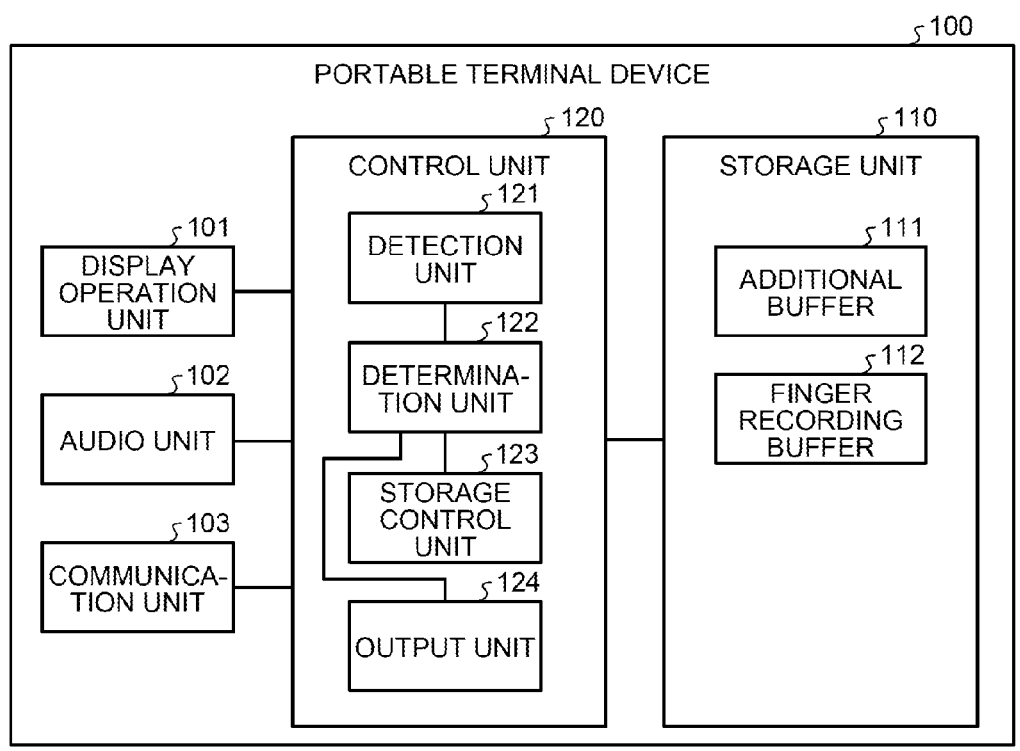
FIG. 1 is a block diagram illustrating an exemplary structure of a portable terminal device according to an embodiment.

FIG. 1 is a block diagram illustrating an exemplary portable terminal device according to an embodiment. A portable terminal device 100 includes a display operation unit 101, an audio unit 102, a communication unit 103, a storage unit 110, and a control unit 120. The portable terminal device 100 may be realized, for example, by a smartphone, a portable phone, a personal handy phone system (PHS), a personal digital assistant or a personal data assistance (PDA).

The display operation unit 101 is configured as a display device which displays various pieces of information and also an input device which receives various operations by a user. For example, the display operation unit 101 may be realized as a display device such as a liquid crystal display. The display operation unit 101 may also be realized as an input device such as a touch panel. That is, a display device is integrated with an input device in the display operation unit 101. The display operation unit 101 is configured as a user interface and receives key input, for example, by displaying a ten-key pad in the lower part of the screen. The display operation unit 101 outputs operation information which has been input by a user with key input as operation information to a control unit 120. The user operation may include, for example, touch operation in which a finger is made to touch any spot on the touch panel, and flick operation in which a finger is slid on the touch panel while keeping the finger on the touch panel. In this case, for example, coordinates of any spot on the touch panel during the touch operation, or coordinates of the starting and ending points during the flick operation may be regarded as the operation information.

The audio unit 102 includes a speaker and a microphone. Upon receiving audio data from the control unit 120, the audio unit 102 performs digital-to-analog (D/A) conversion to generate a sound wave and activates a speaker through which the sound wave is output into space. When the microphone receives the sound wave from space, the audio unit 102 performs analog-to-digital (A/D) conversion to generate audio data which is then output to the control unit 120.

The communication unit 103 may be realized by a wireless communication module corresponding to a communication network such as a mobile telephone network, a wireless local area network (LAN), Bluetooth (registered trademark), and a Near Field Communication technology (NFC). The communication unit 103 may be, for example, a communication interface which is connected to the Internet via a wireless base station for the management of communications of various types of information.

The storage unit 110 may be realized, for example, by a semiconductor memory element such as a random access memory (RAM) and a flash memory, or a storage device such as a hard disc and an optical disc. The storage unit 110 includes an additional buffer 111 and a finger recording buffer 112. The storage unit 110 stores information used in processing to be performed by the control unit 120.

The additional buffer 111 stores characters to be entered at the cursor position in a text area of a screen displayed on the display operation unit 101. The additional buffer 111 receives key input characters entered by the display operation unit 101 and other characters obtained from the finger recording buffer 112. The additional buffer 111 is, for example, a buffer adapting the first-in, first-out (FIFO) system, in which first characters entered are the first ones to be removed. The additional buffer 111 can store any number of characters.

The finger recording buffer 112 stores the number of characters according to the length of flick operation of the user. The finger recording buffer 112 is a buffer adapting the last-in, first-out (LIFO) system, in which last characters entered are the first ones to be removed. The finger recording buffer 112 can enter and remove characters one by one. The finger recording buffer 112 can store any number of characters.

The control unit 120 is realized by, for example, a central processing unit (CPU) or a micro processing unit (MPU), in which a program stored in the built-in storage device is executed in a working area formed by a RAM. The control unit 120 may be realized by, for example, an integrated circuit such as an application specific integrated circuit (ASIC) or a field programmable gate array (FPGA). The control unit 120 includes a detection unit 121, a determination unit 122, a storage control unit 123, and an output unit 124 to realize or execute information processing functions and actions which will be described below. The internal structure of the control unit 120 is not limited to that illustrated in FIG. 1, and other structures may be used so long as the information processing described below will be performed. The control unit 120 performs input and output of audio data to and from the audio unit 102.

The detection unit 121 receives key input and operation information from the display operation unit 101. The detection unit 121 stores the key input characters in the additional buffer 111. The detection unit 121 detects flick operation in the text area, of the screen displayed on the display operation unit 101, where the input character string is displayed. Upon detection of the flick operation in the text area based on the operation information, the detection unit 121 outputs coordinates of a starting point and an ending point of the flick operation to the determination unit 122. Even when the flick operation still continues, the detection unit 121, for example, can output the coordinates of the starting and ending points of a single character to the determination unit 122, upon detection of the movement of the single character by the flick operation in the text area.

When the coordinates of the starting and ending points of the flick operation are input by the detection unit 121, the determination unit 122 determines a direction of the flick operation based on the input coordinates of the starting and ending points. If the direction (character writing direction) in which the characters to be displayed in the text area are written proceeds horizontally, for example, from left to right, the cursor also moves from left to right. At this time, if the ending point is located to the left of the starting point, that is, the direction is reverse to the cursor moving direction, this direction is regarded as a predetermined direction by the determination unit 122, and set as a cutting direction. Alternatively, if the starting point is located to the right of the starting point, that is, the flick operation proceeds in the cursor moving direction, this direction is regarded as a direction reverse to the predetermined direction by the determination unit 122, and set as a pasting direction. That is, the cutting direction represents a direction in which the characters having already been entered in the text area are entered (sucked) to the finger recording buffer 112. The pasting direction represents a direction in which the characters having been stored in the finger recording buffer 112 are output (discharged) into the text area.

The determination unit 122 determines whether the flick operation is performed in the cutting direction or the pasting direction, according to the coordinates of the starting and ending points of the flick operation as well as the character writing direction. The determination unit 122 also determines the starting position and length of the flick operation according to the coordinates of the starting and ending points of the flick operation. The determination unit 122 outputs the determined direction, starting position, and length of the flick operation to the storage control unit 123 and the output unit 124. For example, when the characters are written horizontally from right to left, such as in the case of an Arabic language, a cursor moving direction is reverse to the cursor moving direction when the characters are written from left to right. The determination unit 122 regards the case when the ending point is located to the right side of the starting point of the flick operation as a predetermined direction, and sets this direction as a cutting direction. When the ending point is located to the left of the starting point, this direction is regarded by the determination unit 122 as a direction reverse to the predetermined direction, and is set as the pasting direction. Specifically, the determination unit 122 determines the cutting or pasting direction on the basis of the cursor moving direction. Thus, even when the characters are written vertically, for example, it is also possible to determine whether the flick operation to be performed in a vertical direction is in the cutting direction or the pasting direction.

The storage control unit 123 receives the direction, starting position, and length of the flick operation from the determination unit 122. When the flick operation is in the cutting direction, the storage control unit 123 selects the number of characters according to the length of the flick operation from the character string located at the starting position of the flick operation and stores the selected characters in the finger recording buffer 112. To store the number of characters according to the length of the flick operation, the storage control unit 123 stores these characters in the finger recording buffer 112 successively one by one from the starting position of the flick operation.

The output unit 124 receives the direction, starting position, and length of the flick operation from the determination unit 122. When the flick operation is in the pasting direction, the output unit 124 obtains the number of characters from the finger recording buffer 112 according to the length of the flick operation and stores the obtained characters in the additional buffer 111. The output unit 124 stores the number of characters according to the length of the flick operation in the additional buffer 111 successively one by one from the last character stored in the finger recording buffer 112. The output unit 124 then outputs the characters stored in the additional buffer 111 at the starting position of the flick operation in the text area. The output unit 124 also monitors the additional buffer 111 and, when the key input characters are stored in the additional buffer 111 by the detection unit 121, outputs those characters stored in the additional buffer 111 to the starting position of the flick operation in the text area.

Next, an operation of the portable terminal device 100 according to the embodiment will be described.

Figure 2:
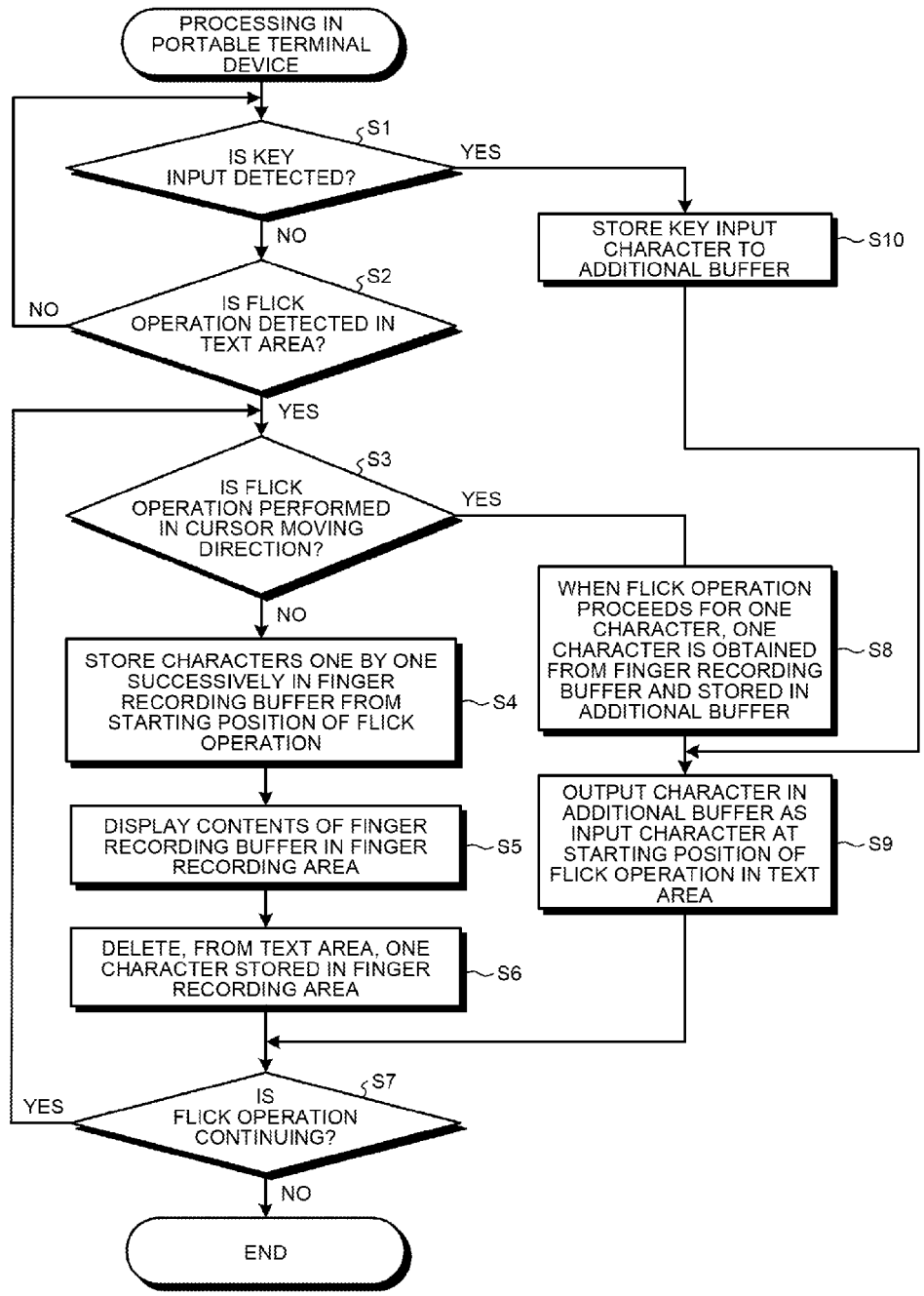
FIG. 2 is a flowchart illustrating exemplary processing performed in the portable terminal device according to the embodiment.

FIG. 2 is a flowchart illustrating exemplary processing of the portable terminal device according to the embodiment. The detection unit 121 of the portable terminal device 100 determines whether key input is detected (step S1) according to the key input from the display operation unit 101. If the key input is not detected (No at step S1), the detection unit 121 determines whether flick operation is detected in the text area of the screen according to the operation information input from the display operation unit 101 (step S2).

Figure 3:
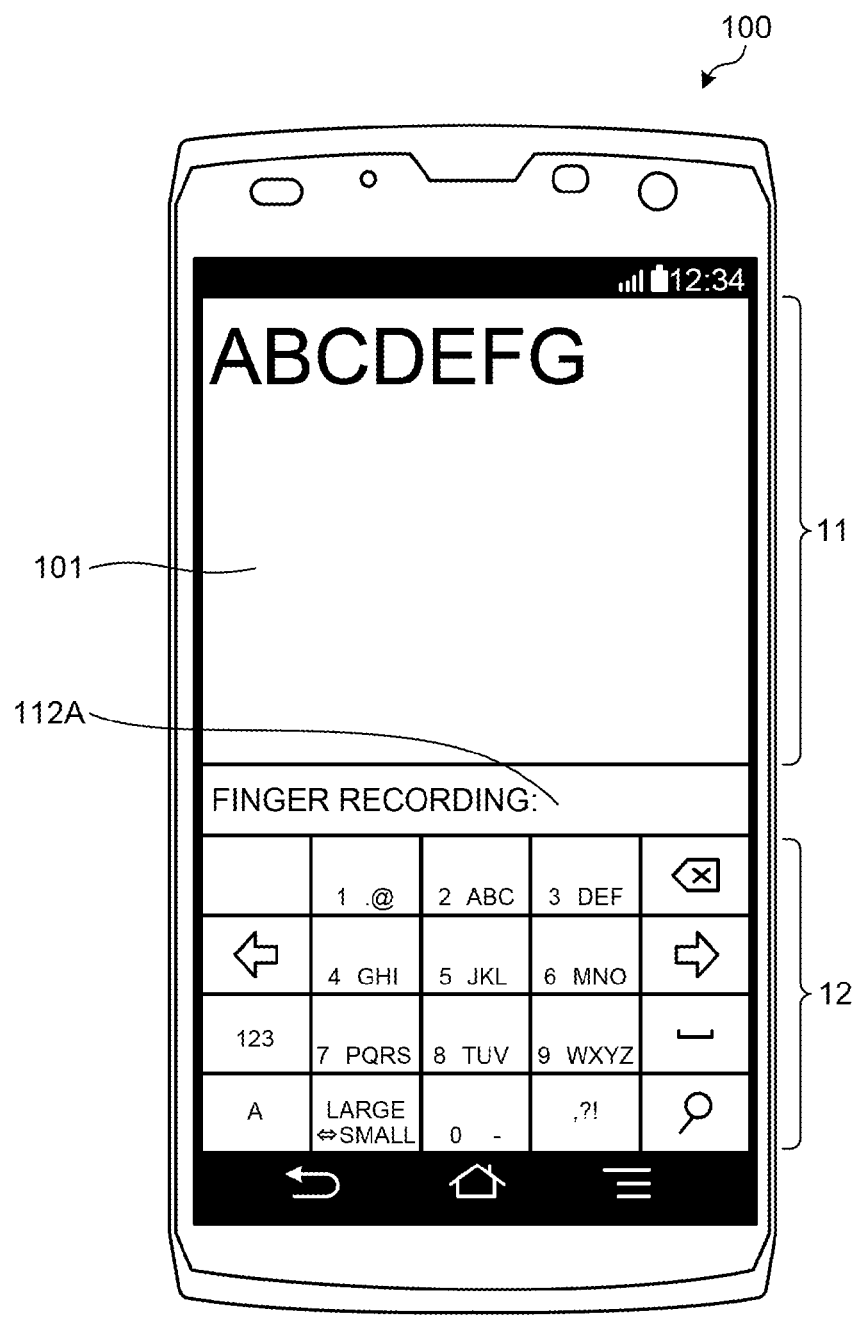
FIG. 3 is an explanatory view illustrating an exemplary screen of the portable terminal device according to the embodiment.

The screen of the portable terminal device 100 will be described. FIG. 3 is an explanatory view illustrating an exemplary screen of the portable terminal device according to the embodiment. For example, the screen of the display operation unit 101 may include a text area 11 where an input character string is displayed, a ten-key pad 12 used to receive key input, and a finger recording area 112A which displays stored contents of the finger recording buffer 112. When the user performs tap operation using the ten-key pad 12, the detection unit 121 detects corresponding key input. The detection unit 121 also detects flick operation when the user performs flick operation in the text area 11.

Referring to FIG. 2 again, the detection unit 121 outputs, when the flick operation is detected in the text area 11 (Yes at step S2), coordinates of the starting and ending points of the flick operation to the determination unit 122. If the flick operation is not detected in the text area 11 (No at step S2) by the detection unit 121, the process returns to step S1.

When the coordinates of the starting and ending points of the flick operation are input by the detection unit 121, the determination unit 122 determines a direction of the flick operation based on the input coordinates of the starting and ending points. The determination unit 122 determines whether the flick operation is in the cursor moving direction, that is, the pasting direction (step S3). The determination unit 122 also determines the starting position and length of the flick operation according to the coordinates of the starting and ending points of the flick operation. If the flick operation is not performed in the cursor moving direction (No at step S3), the determination unit 122 outputs the determined direction, starting position, and length of the flick operation to the storage control unit 123.

Upon receiving the direction, starting position, and length of the flick operation from the determination unit 122, the storage control unit 123 stores in the finger recording buffer 112, when the flick operation is performed in the cutting direction, characters one by one successively from the starting position of the flick operation (step S4). The storage control unit 123 displays the contents of the finger recording buffer 112 in the finger recording area 112A (step S5). The storage control unit 123 deletes the one character stored in the finger recording buffer 112 from the text area 11 (step S6). Specifically, the storage control unit 123 performs processing of cutting characters one by one successively from the starting position of the flick operation in the text area 11 and putting the characters in the finger recording buffer 112 during the processing of steps S4 to S6.

The storage control unit 123 determines whether the flick operation is continuing (step S7). Specifically, the storage control unit 123 determines whether the detection unit 121 continues to detect flick operation, and whether the direction, starting position, and length of the flick operation determined by the determination unit 122 have been entered. If the storage control unit 123 determines that the flick operation is continuing (Yes at step S7), the process returns to step S3. Specifically, when multiple characters are selected along the cutting direction by the flick operation, the characters are stored one by one successively in the finger recording buffer 112. If the storage control unit 123 does not determine that the flick operation is continuing (No at step S7), the process ends.

When the determination unit 122 determines that the flick operation is performed in the cursor moving direction (Yes at step S3), the determined direction, starting position, and length of the flick operation are output to the output unit 124.

The output unit 124 receives the direction, starting position, and length of the flick operation from the determination unit 122. When the flick operation is performed in the pasting direction, and the flick operation is moved for one character, the output unit 124 obtains one character from the finger recording buffer 112 successively one by one from the last character stored, and stores the obtained character in the additional buffer 111 (step S8). The output unit 124 outputs the characters at the starting position of the flick operation in the text area 11 (step S9) by using the characters stored in the additional buffer 111 as input characters. Specifically, the output unit 124 pastes the characters stored in the additional buffer 111 successively one by one at the cursor position in the text area 11.

The output unit 124 determines whether the flick operation is continuing (step S7). Specifically, the output unit 124 determines whether the detection unit 121 continues to detect flick operation and the direction, starting position, and length of the flick operation, which have been determined by the determination unit 122, are entered. If the output unit 124 determines that the flick operation is continuing (Yes at step S7), the process returns to step S3. Specifically, when multiple characters have been stored in the finger recording buffer 112, the characters are pasted one by one successively by the flick operation on the cursor position of the text area 11 via the additional buffer 111. If the output unit 124 does not determine that the flick operation is continuing (No at step S7), the process ends.

Upon detection of key input (Yes at step S1), the detection unit 121 stores the key input characters in the additional buffer 111 (step S10). The output unit 124 monitors the additional buffer 111 and, when the key input characters are stored in the additional buffer 111 by the detection unit 121, outputs those characters stored in the additional buffer 111 to the starting position of the flick operation in the text area 11 (step S9). Specifically, the output unit 124 pastes the key input characters at the cursor position in the text area 11. When the processing of the output unit 124 is completed in step S9, the process proceeds to step S7, as this is the case when the key input is detected and the flick operation is continuing (No at step S7). Thus, the process ends.

In this case, if the user reverses the direction of the flick operation without detaching a finger from the text area, a determination result in step S3 may change. The portable terminal device 100 performs, according to the direction of the flick operation, either cutting processing executed by the storage control unit 123 to cut characters in steps S4 to S6, or pasting processing executed by the output unit 124 to paste characters in steps S8, S9.

Thus, the portable terminal device 100 can perform the cutting or pasting processing of the number of characters according to the length and direction of the flick operation.

Next, a relation between the flick operation and the finger recording buffer will be described.

FIG. 4A is an explanatory view illustrating exemplary flick operations and operations of the finger recording buffer. As illustrated in FIG. 4A, it is assumed that a character string "ABCDEFG" has already been entered in the text area 11 of the portable terminal device 100. It is also assumed that no characters have been stored in the finger recording buffer 112. In this state, the flick operation starts by a finger 13 of a user horizontally from right to left, that is, in the cutting direction, from a starting position near the character "G".

Figure 4:
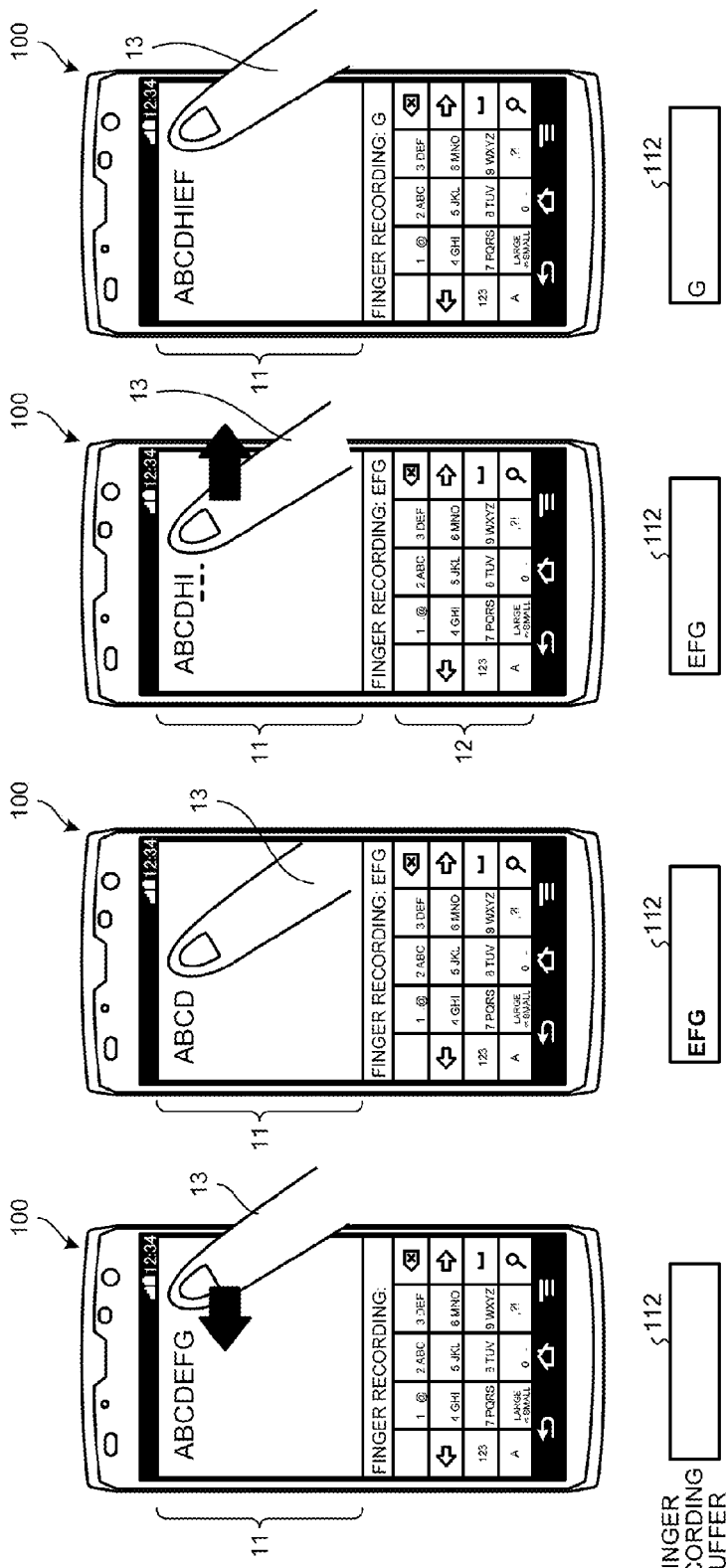
FIG. 4A is an explanatory view illustrating exemplary flick operation and an operation of a finger recording buffer.
FIG. 4B is an explanatory view illustrating other exemplary flick operation and an operation of a finger recording buffer.
FIG. 4C is an explanatory view illustrating other exemplary flick operation and an operation of a finger recording buffer.
FIG. 4D is an explanatory view illustrating other exemplary flick operation and an operation of a finger recording buffer.

FIG. 4B is an explanatory view illustrating other exemplary flick operations and operations of the finger recording buffer. As illustrated in FIG. 4B, when the user performs flick operation by moving a finger 13 to a position where the character "E" is located, the characters "G", "F", and "E" of the character string "ABCDEFG" displayed in the text area 11 are stored in this order in the finger recording buffer 112. Since a newly input character appears on the left side of the finger recording buffer 112 illustrated in FIG. 4, the characters are displayed as "EFG".

FIG. 4C is an explanatory view illustrating other exemplary flick operations and operations of the finger recording buffer. As illustrated in FIG. 4C, the finger 13 of the user is then detached from the text area 11 once and a character string "HI" are input by the ten-key pad 12. In this state, the character string "EFG" that has already been stored in the finger recording buffer 112 remains.

Subsequently, in the text area 11, the flick operation starts by the finger 13 of the user horizontally from left to right, that is, in the pasting direction, from a starting position close to the right of the character "I". FIG. 4D is an explanatory view illustrating other exemplary flick operations and operations of the finger recording buffer. As illustrated in FIG. 4D, a character string "EF" is pasted to the right of the character "I", that is, on the cursor position, according to the length of the flick operation in the portable terminal device 100. At this time, the characters are pasted on the cursor position of "E", "F" in this order from the finger recording buffer 112. Since the length of the flick operation corresponds to two characters, the character "G" remains being stored in the finger recording buffer 112.

Next, how the character string in the text area 11 and the stored contents in the finger recording buffer 112 change will be described according to the user operations.

Figure 5:
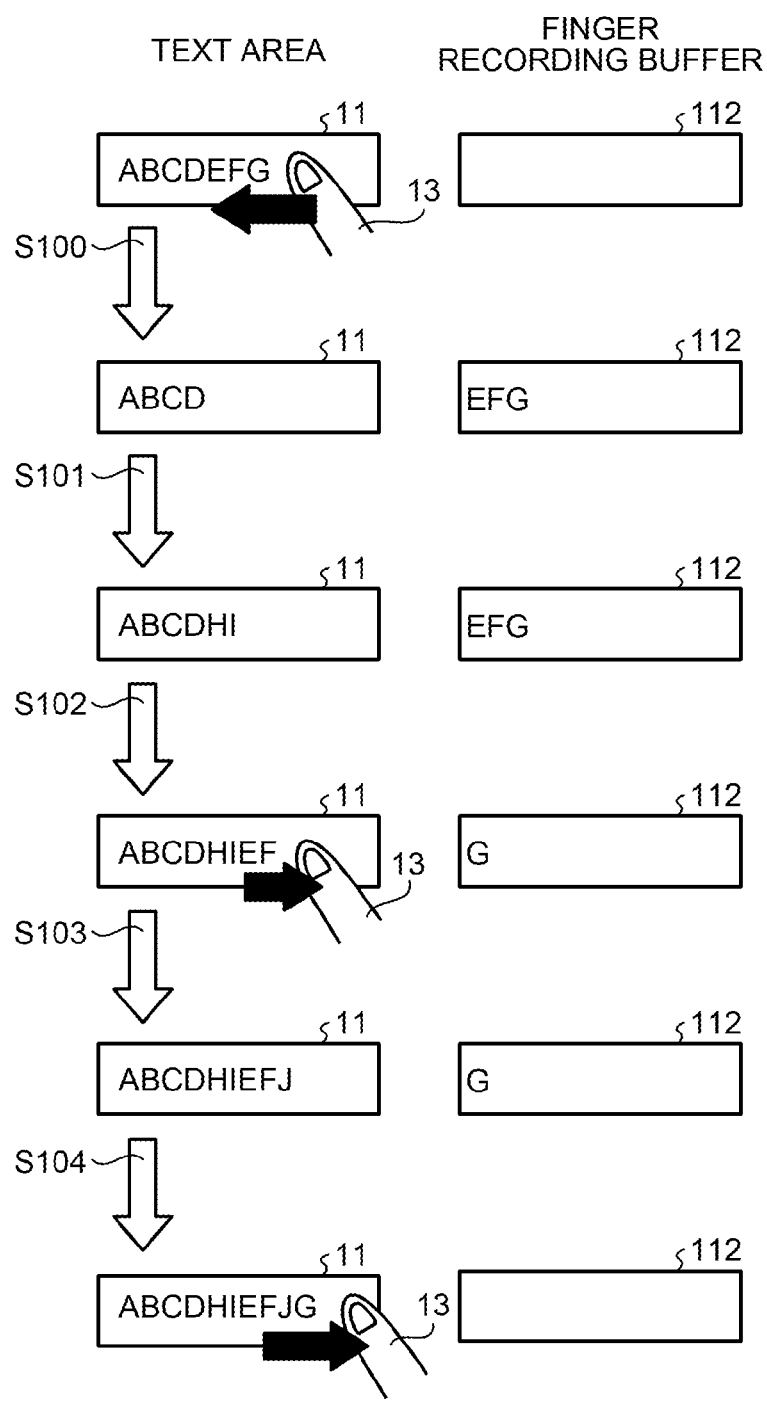
FIG. 5 is an explanatory view illustrating exemplary transition of a text area and a finger recording buffer by flick operation.

FIG. 5 is an explanatory view illustrating an example of how the text area and the finger recording buffer change by the flick operation. Similar to FIG. 4A, the character string "ABCDEFG" has already been entered in the text area 11. It is also assumed that no characters have been stored in the finger recording buffer 112. In this state, the flick operation starts by the finger 13 of the user horizontally from right to left, that is, in the cutting direction, from a starting position near the character "G". The user performs the flick operation by moving the finger 13 to a position where the character "E" is located. The characters "G", "F", and "E" of the character string "ABCDEFG" displayed in the text area 11 are stored in this order in the finger recording buffer 112 of the portable terminal device 100 (step S100).

The user enters a character string "HI" in the text area 11 by key input (step S101). The user then starts the flick operation with the finger 13 in the pasting direction from a starting position close to the right of the character "I". The character string "EF" is pasted to the right of the character "I", that is, on the cursor position according to the length of the flick operation in the portable terminal device 100 (step S102). The character "G" remains being stored in the finger recording buffer 112.

The user enters a character "J" in the text area 11 by key input (step S103). The user then starts the flick operation with the finger 13 in the pasting direction from a starting position close to the right of the character "J". The portable terminal device 100 causes the character string "G" to be pasted to the right of the character "J" according to the length of the flick operation, that is, the cursor position (step S104). In this state, the finger recording buffer 112 becomes empty as all characters are output.

As illustrated in FIGS. 4A to 4D and FIG. 5, the portable terminal device 100 can perform an editing operation as if the characters were sucked in and discharged from the finger. Accordingly, the text editing can be performed in less time.

The portable terminal device 100 thus detects flick operation in the text area where the input character string is displayed, and determines the direction of the detected flick operation. When the flick operation is performed in the predetermined direction, the portable terminal device 100 selects the number of characters according to the length of the flick operation from the character string located at the starting position of the flick operation, and stores the selected characters in the finger recording buffer. When the flick operation is performed in the direction reverse to the predetermined direction, the portable terminal device 100 obtains the number of characters according to the length of the flick operation from the finger recording buffer, and outputs the selected characters to the starting position of the flick operation in the text area. As a result, the character string can be edited by fewer procedures. In addition, the character string can be divided before being pasted.

Further, the portable terminal device 100 stores the selected characters in the finger recording buffer successively from the character located at the starting position of the flick operation. The portable terminal device 100 then outputs the number of characters according to the length of the flick operation in the finger recording buffer successively from the last character stored therein. As a result, the characters can be pasted successively from the last character cut.

In the above embodiment, once the characters are stored in the finger recording buffer 112, the characters are pasted in the text area 11 by the flick operation in the pasting direction, but the operation is not limited thereto. For example, when the characters are already stored in the finger recording buffer 112, the portable terminal device 100 may additionally store the number of characters according to the length of a new flick operation to those characters already stored in the finger recording buffer 112. For example, if the character string "ABC" has already been stored in the finger recording buffer 112, a new character string "KL" may be additionally stored by a new flick operation to thereby store a character string "ABCKL". At this time, when the flick operation is performed in the pasting direction, the portable terminal device 100 pastes the characters in the text area 11 successively of "L", "K", "C", "B", and "A" according to the length of the flick operation. Even when the flick operation in the pasting direction is suspended by the user, the portable terminal device 100 may paste the rest of the characters at another position by also performing there the flick operation in the pasting direction.

Thus, when the characters are already stored in the finger recording buffer, and the newly detected flick operation is performed in the predetermined direction, the portable terminal device 100 selects the number of characters according to the length of the flick operation from the character string located at the starting position of the flick operation. The portable terminal device 100 additionally stores the selected characters to the characters already stored in the finger recording buffer. As a result, cutting and pasting multiple characters at various locations of a sentence can be performed easily.

In the above embodiment, the character string has already been entered before the cutting operation, but the operation is not limited thereto. For example, the portable terminal device 100 may copy the character string having already been entered and store the character string in the finger recording buffer 112, to thereby paste the character string stored in the finger recording buffer 112 to another editing location. As a result, the character string can be copied to another editing location without affecting the character string having already been entered.

In the above embodiment, alphabets have been used as examples of characters, but the characters are not limited thereto. For example, two-byte characters such as kanji or hiragana may be used so that the portable terminal device 100 can similarly cut such characters one by one successively, stores them in the finger recording buffer 112, and paste the characters of the character string stored in the finger recording buffer 112 one by one successively. Control characters such as a line feed character may also be included. As a result, the text editing can be performed without being aware of the difference between one-byte and two-byte characters.

In the above embodiment, the flick operation has been performed either in the character writing direction or in the reverse direction thereof, but the direction is not limited thereto. When the flick operation is performed slantwise, for example, in the cutting direction for the sentences having multiple lines, the portable terminal device 100 may store, in the finger recording buffer 112, characters on which the trajectory of the flick operation passes successively. When the characters are already stored in the finger recording buffer 112 and the flick operation is performed slantwise, for example, in the pasting direction in the text area where no characters have been entered, the portable terminal device 100 may paste the characters having already been stored successively on positions where the trajectory of the flick operation passes. At this time, the portable terminal device 100 may fill in the space between the starting position of the line and the pasting characters with spaces or tabs. As a result, the character string can be edited more flexibly.

In the above embodiment, the portable terminal device 100 has been used as an example of the information processing apparatus, but such an apparatus is not limited thereto. Alternatively, a stationary type personal computer may be used as the information processing apparatus.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, the detection unit 121 may be integrated with the determination unit 122 to allow determination of the flick operation as well.

Further, all or a certain part of various processing functions performed in each part of the embodiment may be executed on a microcomputer such as a CPU (or a microcomputer such as a MPU or a micro control unit (MCU)). Indeed, all or a certain part of the various processing functions may be performed on a program which is analyzed and executed on a CPU (or a microcomputer such as an MPU or an MCU), or on hardware by wired logic.

Figure 6:
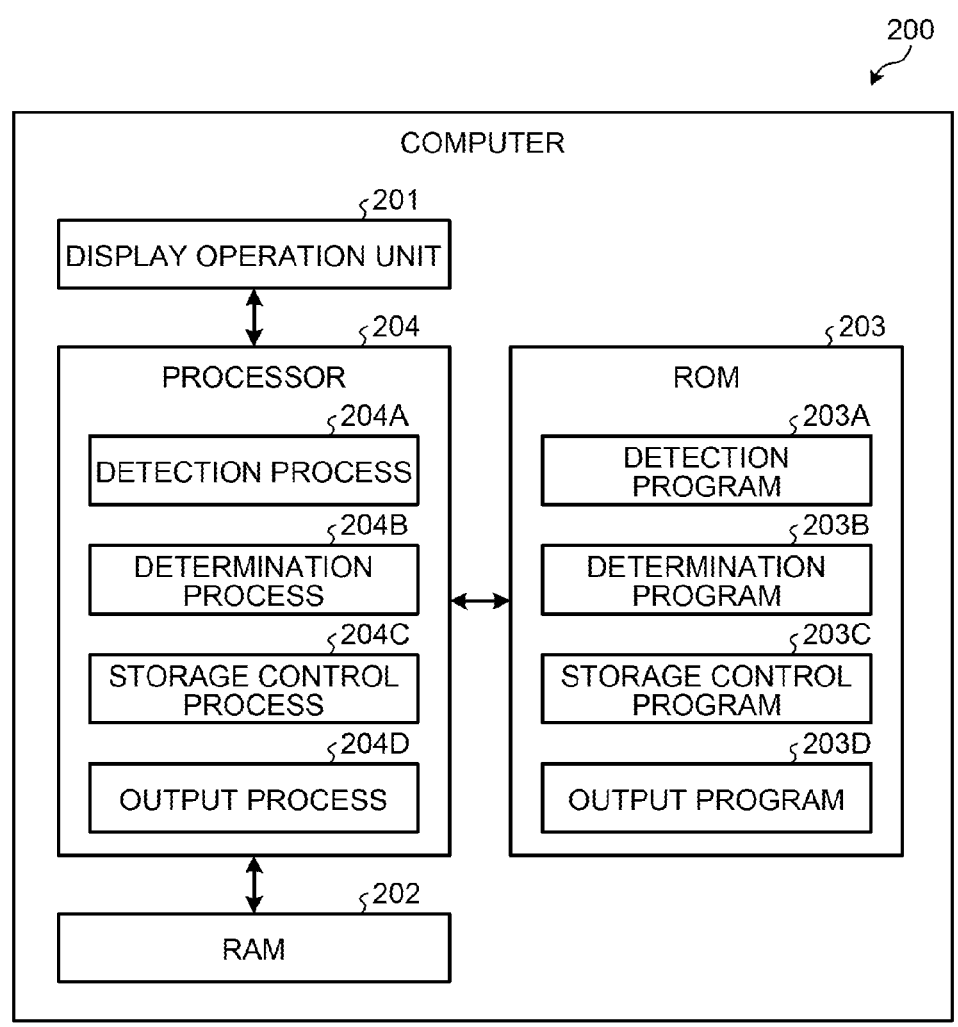
FIG. 6 is an explanatory view illustrating an exemplary computer configured to execute an information processing program.

The various types of processing described in the embodiment above can be realized by executing a previously prepared program on a computer. Therefore, an exemplary computer structure configured to execute a program having a function similar to that of the above embodiment will be described below. FIG. 6 is an explanatory view illustrating an exemplary computer configured to execute an information processing program.

A computer 200, as illustrated in FIG. 6, configured to execute the information processing program includes a display operation unit 201, a random access memory (RAM) 202, a read only memory (ROM) 203, and a processor 204. The display operation unit 201 receives flick operation and key input by the user and displays a screen such as an operation screen or an editing screen. The processor 204 controls the entire computer 200.

An information processing program exerting a function similar to that of the above embodiment is previously stored in the ROM 203. Instead of the ROM 203, an information processing program which is readable by a drive not illustrated may be recorded in a recording medium. As a recording medium, a portable recording medium such as a CD-ROM, a DVD disc, or a USB memory, or a semiconductor memory such as a flash memory, may be used. As illustrated in FIG. 6, the information processing program includes a detection program 203A, a determination program 203B, a storage control program 203C, and an output program 203D. The programs 203A to 203D may be integrated or distributed appropriately. An additional buffer, a finger recording buffer, and the like have been stored in the RAM 202.

The processor 204 reads the programs 203A to 203D from the ROM 203 and executes these programs that have been read. As illustrated in FIG. 6, the processor 204 is configured to cause the programs 203A to 203D to function as a detection process 204A, a determination process 204B, a storage control process 204C, and an output process 204D.

The processor 204 detects the flick operation in the text area where the input character string is displayed, and determines a direction of the detected flick operation. When the flick operation is performed in a determined direction, the processor 204 selects the number of characters according to the length of the flick operation from the character string located at the starting position of the flick operation, and stores the selected characters in the finger recording buffer. When the flick operation is performed in the direction reverse to the predetermined direction, the processor 204 selects the number of characters according to the length of the flick operation from the finger recording buffer, and outputs the selected characters to the starting position of the flick operation in the text area. As a result, the character string can be edited by fewer procedures.

According to an aspect of an embodiment of the present invention, a character string can be edited with fewer procedures.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus, comprising:
   a memory; and
   a processor coupled to the memory, wherein the processor executes a process comprising:
      detecting flick operation in a text area where an input character string is displayed;
      determining a direction of the detected flick operation;
      selecting, when a first flick operation is performed in a predetermined direction reverse to the character writing direction, characters the number of which is according to a length of the first flick operation from the character string located at a starting position of the first flick operation;
      storing the selected characters in a finger recording buffer adapting a last-in, first-out (LIFO) system upon detecting the predetermined direction, the starting position, and the length of the flick operation;
      obtaining, when a second flick operation is performed in a direction reverse to the predetermined direction, the number of characters according to the length of the second flick operation from the finger recording buffer; and
      outputting, in accordance with the LIFO system of the finger recording buffer, the obtained characters to the starting position of the second flick operation in the text area and removing the obtained characters from the finger recording buffer.

2. The information processing apparatus according to claim 1, wherein the storing includes storing the selected characters in the finger recording buffer successively from a character located at the starting position of the first flick operation, and the outputting includes successively outputting characters the number of which is according to the length of the second flick operation from the last character stored in the finger recording buffer.

3. The information processing apparatus according to claim 1, wherein the selecting includes selecting, when the finger recording buffer has already stored characters and a new flick operation is detected to be performed in the predetermined direction, characters the number of which is according to the length of the first flick operation from the character string located at the starting position of the first flick operation, the storing includes storing the selected characters additionally to the characters already stored in the finger recording buffer.

4. An information processing method comprising:
   detecting, using a processor, flick operation in a text area where an input character string is displayed;
   determining, using the processor, a direction of the detected flick operation;
   selecting, when a first flick operation is performed in a predetermined direction reverse to the character writing direction, characters the number of which is according to a length of the first flick operation from the character string located at a starting position of the first flick operation, using the processor;
   storing, using the processor, the selected characters in a finger recording buffer adapting a last-in, first-out (LIFO) system upon detecting the predetermined direction, the starting position, and the length of the flick operation;
   obtaining, when a second flick operation is performed in a direction reverse to the predetermined direction, the number of characters according to the length of the second flick operation from the finger recording buffer; and
   outputting, using the processor and in accordance with the LIFO system of the finger recording buffer, the obtained characters to the starting position of the second flick operation in the text area and removing the obtained characters from the finger recording buffer.

5. A non-transitory computer-readable recording medium having stored therein an information processing program causing a computer to execute a process comprising:
   detecting flick operation in a text area where an input character string is displayed;
   determining a direction of the detected flick operation;
   selecting, when a first flick operation is performed in a predetermined direction reverse to the character writing direction, characters the number of which is according to a length of the first flick operation from the character string located at a starting position of the first flick operation;
   storing the selected characters in a finger recording buffer adapting a last-in, first-out (LIFO) system upon detecting the predetermined direction, the starting position, and the length of the flick operation;
   obtaining, when a second flick operation is performed in a direction reverse to the predetermined direction, the number of characters according to the length of the second flick operation from the finger recording buffer; and
   outputting, in accordance with the LIFO system of the finger recording buffer, the obtained characters to the starting position of the second flick operation in the text area and removing the obtained characters from the finger recording buffer.

* * * * *